United States Patent
Marashdeh et al.

(10) Patent No.: US 10,488,236 B2
(45) Date of Patent: Nov. 26, 2019

(54) VELOCITY VECTOR FIELD MAPPING USING ELECTRICAL CAPACITANCE SENSORS

(71) Applicants: Tech4Imaging LLC, Columbus, OH (US); Ohio State Innovation Foundation, Columbus, OH (US)

(72) Inventors: Qussai Marashdeh, Columbus, OH (US); Fernando Teixeira, Columbus, OH (US); Shah Chowdhury, Columbus, OH (US)

(73) Assignees: Tech4Imaging LLC, Columbus, OH (US); Ohio State Innovation Foundation, Columbus, OH (US)

( * ) Notice: Subject to any disclaimer, the term of this patent is extended or adjusted under 35 U.S.C. 154(b) by 77 days.

(21) Appl. No.: 15/051,109

(22) Filed: Feb. 23, 2016

(65) Prior Publication Data
US 2017/0241817 A1   Aug. 24, 2017

(51) Int. Cl.
*G01F 1/64* (2006.01)
(52) U.S. Cl.
CPC ..................... *G01F 1/64* (2013.01)
(58) Field of Classification Search
None
See application file for complete search history.

(56) References Cited

U.S. PATENT DOCUMENTS

| | | | |
|---|---|---|---|
| 5,130,661 A * | 7/1992 | Beck | G01N 27/226 |
| | | | 324/663 |
| 5,262,730 A | 11/1993 | Smith et al. | |
| 5,279,163 A | 1/1994 | D'Antonio et al. | |
| 6,208,204 B1 | 3/2001 | Suzuki et al. | |
| 7,424,462 B2 | 9/2008 | Avni et al. | |
| 7,684,846 B2 | 3/2010 | Johnson et al. | |
| 8,461,852 B2 | 6/2013 | Yang et al. | |
| 8,508,238 B2 * | 8/2013 | Mahalingam | A61B 5/0536 |
| | | | 324/603 |
| 8,519,722 B1 | 8/2013 | Prendergast | |
| 8,867,928 B2 | 10/2014 | Piehler | |
| 9,016,143 B2 | 4/2015 | Mamigonians | |
| 9,170,224 B2 | 10/2015 | Fan et al. | |
| 9,579,038 B2 | 2/2017 | Brunner et al. | |
| 9,581,560 B2 | 2/2017 | Fan et al. | |
| 2002/0028010 A1 | 3/2002 | Toida | |
| 2003/0020493 A1 | 1/2003 | Haase et al. | |
| 2003/0173958 A1 | 9/2003 | Goldfine et al. | |

(Continued)

FOREIGN PATENT DOCUMENTS

| CN | 102954854 A | 3/2013 |
|---|---|---|
| EP | 0606115 A1 | 7/1994 |

(Continued)

OTHER PUBLICATIONS

Huang et al., Design of Sensor Electronics for Electrical Capacitance Tomography, IEE Proceedings G (Circuits, Devices and Systems), vol. 139, Issue 1, Feb. 1992, p. 83-88.

(Continued)

*Primary Examiner* — Steven B Gauthier
(74) *Attorney, Agent, or Firm* — Standley Law Group LLP (57) ABSTRACT

The present invention provides a system and method for velocity vector field calculation at the voxel level of a multi-phase flow system using Electrical Capacitance Volume Tomography sensors.

10 Claims, 5 Drawing Sheets

(a)

(56) References Cited

U.S. PATENT DOCUMENTS

| | | | |
|---|---|---|---|
| 2004/0233191 A1 | 11/2004 | Mukherjee et al. | |
| 2005/0167588 A1 | 8/2005 | Donnangelo | |
| 2007/0024278 A1 | 2/2007 | Walters et al. | |
| 2007/0133746 A1* | 6/2007 | Ortiz Aleman | G01F 1/64 378/59 |
| 2008/0116995 A1 | 5/2008 | Kim et al. | |
| 2009/0272028 A1 | 11/2009 | Drozd et al. | |
| 2010/0097374 A1* | 4/2010 | Fan | A61B 5/0535 345/420 |
| 2010/0132473 A1 | 6/2010 | Willcox | |
| 2010/0148804 A1 | 6/2010 | Jakoby et al. | |
| 2010/0332170 A1* | 12/2010 | Gao | G01N 27/228 702/65 |
| 2011/0109911 A1 | 5/2011 | Podoleanu | |
| 2012/0268135 A1 | 10/2012 | Marsala et al. | |
| 2013/0085365 A1* | 4/2013 | Marashdeh | A61B 5/05 600/386 |
| 2013/0187641 A1 | 7/2013 | Singer | |
| 2013/0275082 A1 | 10/2013 | Follmer et al. | |
| 2014/0361793 A1 | 12/2014 | Marashdeh et al. | |
| 2014/0365152 A1 | 12/2014 | Marashdeh et al. | |
| 2015/0338364 A1* | 11/2015 | Fan | G01N 27/026 324/663 |
| 2016/0025663 A1 | 1/2016 | Lehikoinen et al. | |
| 2016/0091448 A1 | 3/2016 | Soleimani | |
| 2016/0206227 A1 | 7/2016 | Marashdeh et al. | |

FOREIGN PATENT DOCUMENTS

| | | |
|---|---|---|
| WO | 2010007096 A3 | 1/2010 |
| WO | 2011002793 A1 | 1/2011 |

OTHER PUBLICATIONS

Marashdeh, Q. et al., Adaptive Electrical Capacitance Volume Tomography, IEEE Sensors Journal, Apr. 2014, pp. 1253-1259, vol. 14, No. 4.

Yang, W. et al., Image Reconstruction Algorithms for Electrical Capacitance Tomography, Measurement Science and Technology 14, 2003, pp. R1-R13.

Xie, C. et al., Electrical Capacitance Tomography for Flow Imaging: System Model for Development of Image Reconstruction Algorithms and Design of Primary Sensors, IEEE Proceedings-G, Feb. 1992, pp. 89-98, vol. 139, No. 1.

Chew, W. et al., Reconstruction of Two-Dimensional Permittivity Distribution Using the Distorted Born Iterative Method, IEEE Transactions on Medical Imaging, Jun. 1990, pp. 218-225, vol. 9, No. 2.

Covilakam, M., "Evaluation of Structural Monitoring Methods for Large Diameter Water Transmission Pipelines", Dec. 2011, The University of Texas at Arlington.

Marashdeh, et al., "On the ECT Sensor Based Dual Imaging Modality System for Electrical Permittivity and Conductivity Measurements", 2006, pp. 1-6, The Ohio State University, Columbus, Ohio.

Warsito, et al., "Electrical Capacitance Volume Tomography", 2007, pp. 1-9.

Sunes, C. et al., A Comparison Between Electrical Capacitance Tomography and Displacement-Current Phase Tomography, IEEE Sensors Journal, Dec. 15, 2017, vol. 17, No. 24.

Wang, F. et al., Electrical Capacitance Volume Tomography: Design and Applications, Sensors, 2010 pp. 1890-1917.

Wikipedia, Electrical Capacitance Volume Tomography, https://en.wikipedia.org/w/index.php?title=Electrical_capacitance_volume_tomography&oldid=868112998, site visited Dec. 7, 2018.

* cited by examiner

Velocity Vector Field Algorithm
Figure 2

Velocity profile: Spheres are Moved in x Direction (6)

VELOCITY VECTOR FIELD MAPPING USING ELECTRICAL CAPACITANCE SENSORS

BACKGROUND AND SUMMARY OF THE INVENTIVE FIELD

Velocimetry is the process of providing instantaneous velocity vector measurements of a flow in a cross-section or volume. In fluid dynamics, measurements of velocity vector fields are important as it can be used to calculate derivative quantities such as rate of strain, and integral quantifies such as fluxes. Studying fluid mechanics is extremely challenging and complex as it involves interactions on the molecular and particle levels. Non-invasive tools that can help shed a light on flow behavior resulting from such interactions between flow components are very valuable. In many engineering problems, heat and mass transfer processes are strongly controlled by fluid motions. Understanding the fluid motion can help control such processes.

Computational Fluid Dynamics (CFD) techniques are often used to simulate flow behavior. However, those simulations do not completely capture the physical world and require a validation method through instantaneous visualization of fluid vector fields, including velocity.

There has been a variety of instruments used for measuring the velocity profile of a flow. For example Particle Doppler Velocimetry (PDV) and Particle Image Velocimetry (PIV) are two technologies for imaging velocity vector fields. Nevertheless, such instruments suffer from different shortcomings as many of them attempt to predict the velocity profile from following a few tracer particles. Moreover, the applicability of such techniques is often restricted to laboratory environment as used sensors are usually fragile.

Electrical Capacitance Tomography (ECT) has been applied to determine the velocity profile of multiphase flows. In these applications, twin plane ECT sensors were used to measure the velocity by cross-correlation between two 2D images from each ECT plane. However, the velocity profile found by this method is different from true flow velocity which can be quite complicated. This method is often restricted to measuring average velocity of a flow instead of mapping a vector velocity profile. Electrical Capacitance Volume Tomography (ECVT) has also been used to determine the velocity profile of a gas-solid fluidized bed by cross-correlation between successive two 3D images. Though still relying on cross-correlation, the ECVT based velocimetry has been the first successful effort to capture the true flow velocity as it is based on 3D volumetric imaging from which the volumetric velocity profile is calculated. However, cross-correlation of volume images poses two main obstacles: First, it is computationally intensive and cannot be applied for real-time velocity profiling applications. Second, the velocity profile lacks accuracy as any error from the image reconstruction process contaminates any subsequent calculations of velocity profiling based on cross-correlation since the images are used as inputs to the calculation process. The present invention provides a faster and more accurate method for velocimetry needed in many industrial applications.

A novel solution for velocity profile mapping is provided by the present invention. The proposed method is aimed at determining volumetric velocity profile of multiphase flows. It is based on ECVT and Adaptive ECVT (AECVT) sensors and uses the capacitive sensor sensitivity gradient to measure the velocity profile. Unique and salient aspects to this novel approach are: 1) the gradient of sensitivity distribution of an ECVT or AECVT capacitive sensor is used to extract velocity information from successive capacitance measurements directly; and 2) unlike velocimetry based on cross-correlation, the present approach requires only one three-dimensional (3D) reconstructed image. Consequently, the complexity of reconstruction of the present approach to determine the velocity profile is much lower than the cross-correlation velocimetry and similar to that of conventional ECT/ECVT/AECVT permittivity profile reconstruction (i.e., Linear Back Projection and Landweber Iteration).

The main steps of the system and method of the present invention are described as: 1) two successive capacitance measurements are taken from an ECVT or AECVT sensor that surrounds the flow vessel; 2) the time interval between the measurements is determined by the inverse of the frame rate of the data acquisition system; 3) from the capacitance measurements of the first frame, a 3D image is reconstructed using conventional volume tomography (e.g. Linear Back Projection and Landweber Iteration, or neural network based nonlinear technique, etc.) that gives the initial volumetric permittivity distribution inside the vessel; 4) the sensitivity gradient is calculated numerically from sensor sensitivity distribution and voxel dimensions; and 5) then, the data is put together, namely i) the time rate change of capacitance, ii) the initial permittivity distribution, and iii) the sensitivity gradient, with a novel algorithm based on Linear Back Projection, Landweber Iteration, or other commonly used reconstruction methods to yield a 3D velocity profile.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1A:
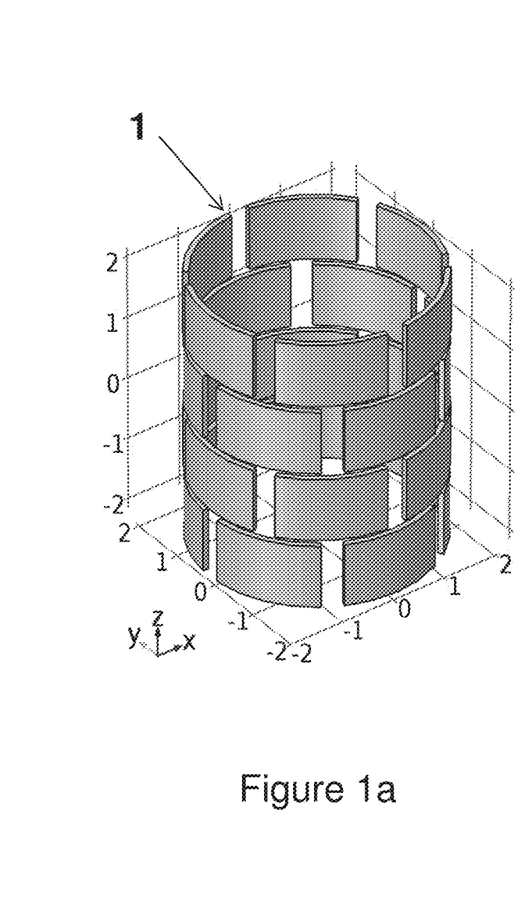
FIG. 1*a* illustrates a typical 24 electrode ECVT sensor with 4 planes of plates.
Figure 1B:
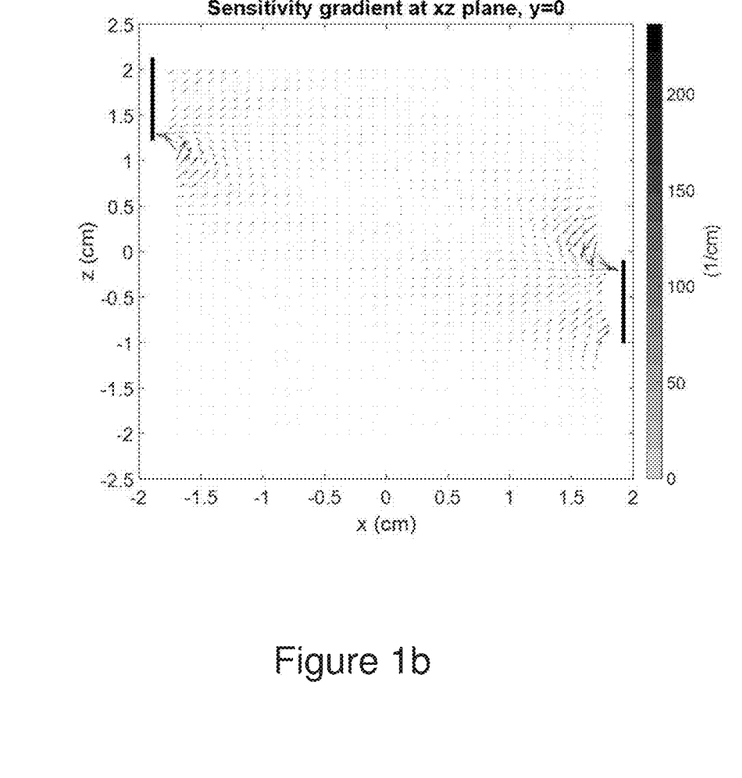
FIG. 1*b* illustrates a sensitivity gradient at the xz plane between an opposite pair of electrodes at two different planes.

FIG. 1*a* illustrates a typical 24 electrode ECVT sensor (1) with 4 planes of plates. FIG. 1*b* illustrates a sensitivity gradient at the xz plane between an opposite pair of electrodes at two different planes. The sensitivity gradient map is obtained by applying a gradient operator to the sensitivity map of the ECVT sensor.

Figure 2:
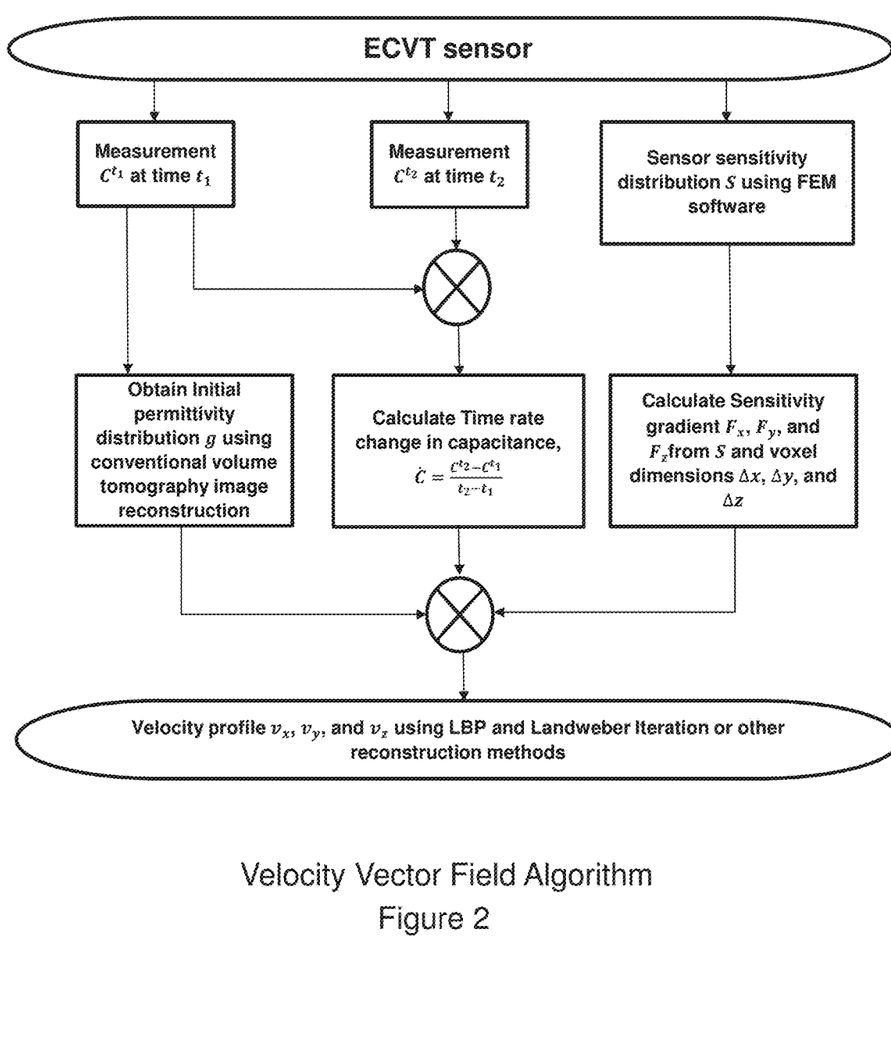
FIG. 2 is a flow chart of the velocity vector field profile calculation and reconstruction.

FIG. 2 illustrates a flow chart of on embodiment of the velocity algorithm for vector field mapping of velocity at each voxel location. A voxel is a 3D pixel. Pixels are usually used for 2D discretization of a surface, and voxel is for 3D of a volume. Capacitance frames are acquired at different times and used to calculate the time derivative of capacitance from the known frame rate of the data acquisition. Frame is one set of capacitance measurements that are used to reconstruct one image. Frame rate is the number of capacitance sets that are produced by the acquisition system per second. This is also the maximum number of images that can be reconstructed per second, assuming a real-time reconstruction, as each capacitance frame can produce one reconstructed image. A sensitivity gradient is calculated from the ECVT sensor sensitivity matrix. The sensitivity gradient is the rate of change in the sensitivity matrix in the x, y, and z directions; the sensitivity matrix is a spatial map of sensor sensitivity; and gradient is the space derivative of this map. An image is reconstructed from the capacitance data at the first fame. A velocity reconstruction algorithm, similar to image reconstruction algorithms, is employed to reconstruct the velocity vector field at each voxel. The inputs for the velocity algorithm are the capacitance time derivative, the reconstructed image at the first capacitance frame, and the gradient of the sensor sensitivity matrix. Capacitance time derivative is the difference between capacitance measurements from one frame to another over the time difference between the acquisitions of those frames. For example, if Ct1 was acquired at t1 and Ct2 at t2, the time derivative is (Ct1−Ct2)/(t1−t2). (Here Ct1 and Ct2 are capacitance measurements from the same pair of plates but in different time frames.)

Figure 3A:
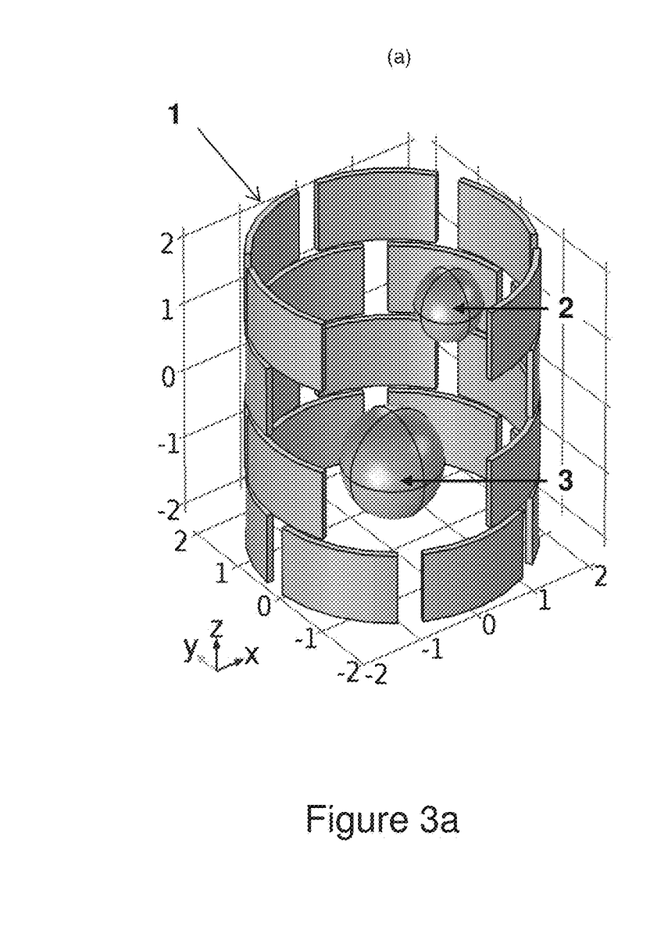
FIG. 3*a* illustrates one embodiment of an ECVT sensor with dielectric spheres.
Figure 3B:
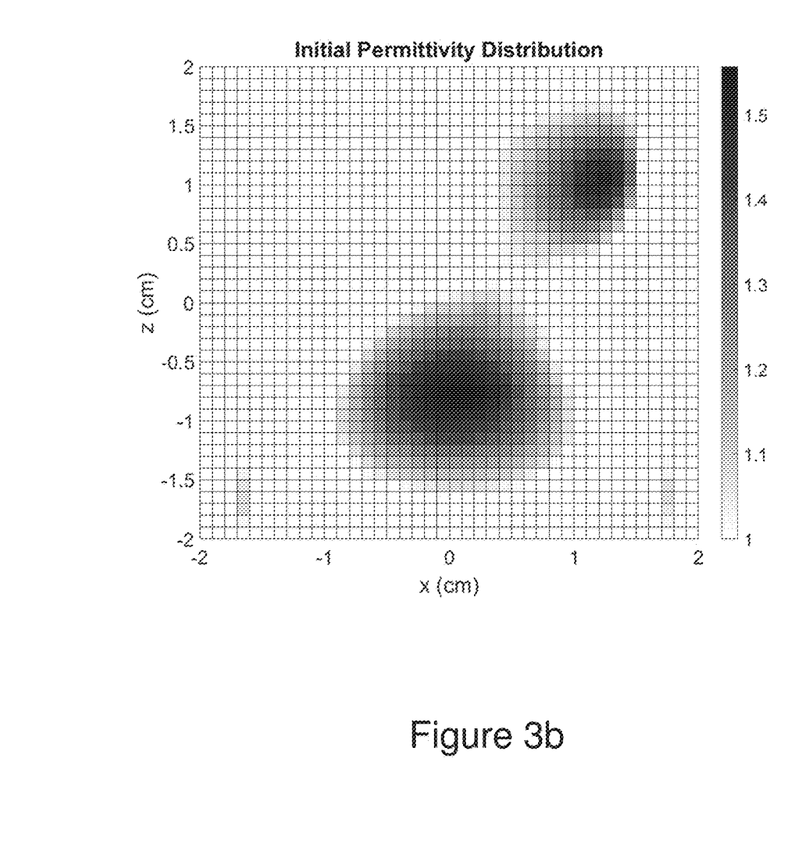
FIG. 3*b* illustrates initial permittivity distribution in xz plane at y=0, reconstructed with Landweber Iterative method.
Figure 4A:
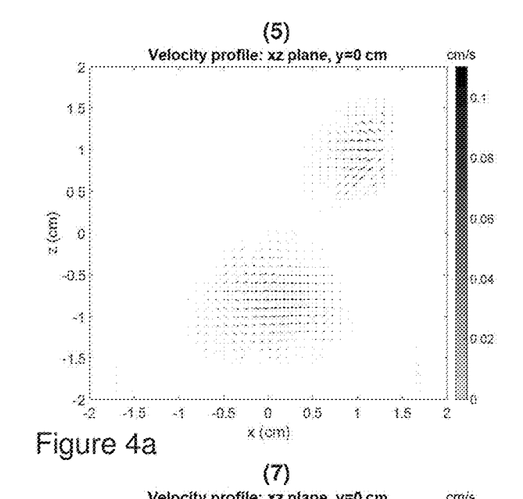
FIGS. 4*a-d* illustrate a velocity vector profile of spheres moving in the x direction.
Figure 4B:
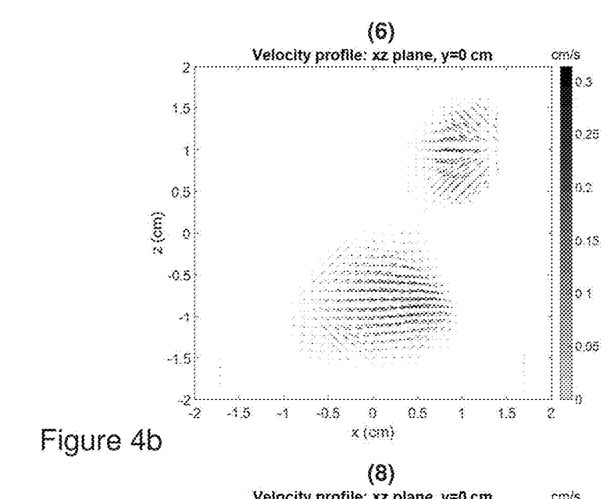
Figure 4C:
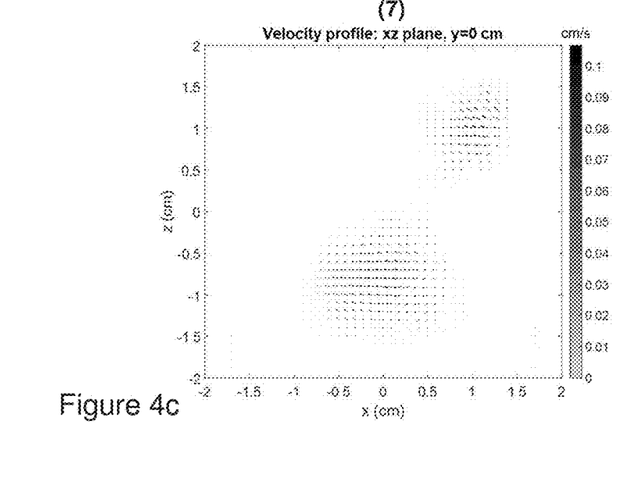
Figure 4D:
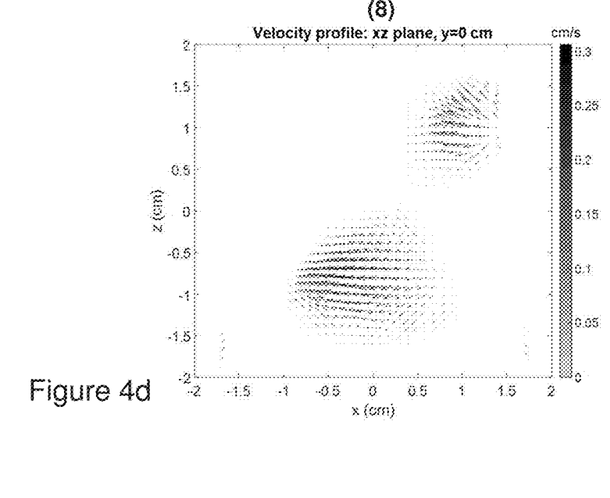
Figure 5A:
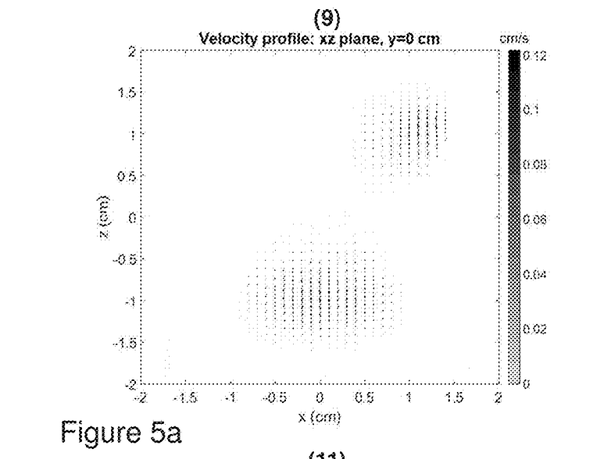
FIGS. 5*a-d* illustrate a velocity vector profile of spheres moving in the z direction.
Figure 5B:
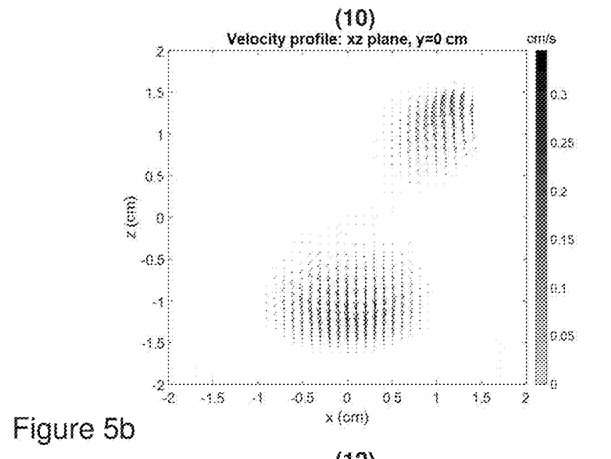
Figure 5C:
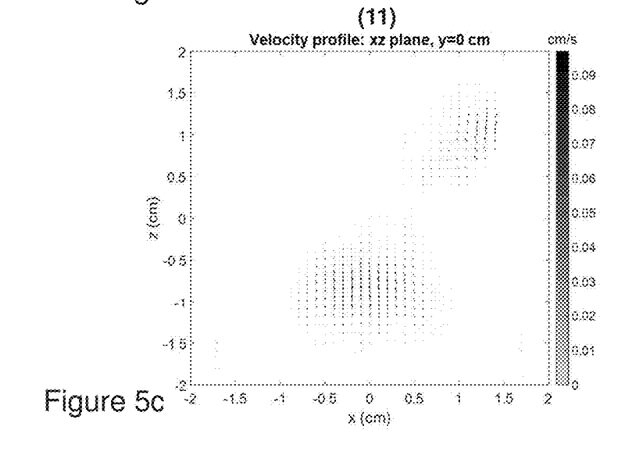
Figure 5D:
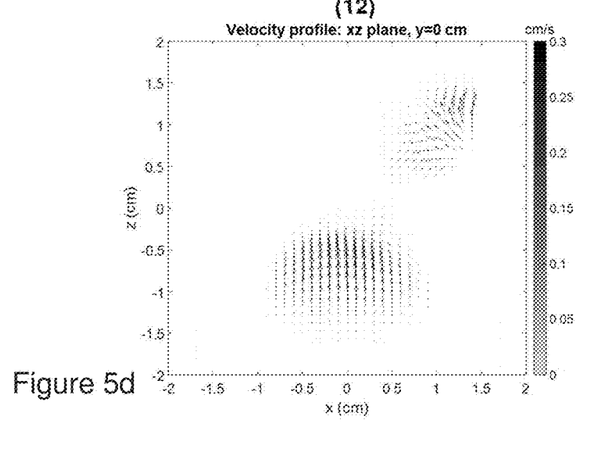

FIG. 3a illustrates one embodiment of an ECVT sensor with dielectric spheres indicated as (2) and (3). FIG. 3b illustrates initial permittivity distribution in xz plane at y=0, reconstructed with Landweber Iterative method.

FIGS. 4a, 4b, 4c and 4d illustrate one embodiment of a velocity profile calculated using the innovative technique for spheres (2) and (3) moving with velocities (5) $\vec{v}_2=-0.1\hat{a}_x$ cm/s, $v_3=0.1\hat{a}_x$ cm/s, (6) $\vec{v}_2=-0.3\hat{a}_x$ cm/s, $v_3=0.3\hat{a}_x$ cm/s, (7) $\vec{v}_2=-0.1\hat{a}_x$ cm/s, $v_3=-0.1\hat{a}_x$ cm/s, and (8) $\vec{v}_2=-0.3\hat{a}_x$ cm/s, $v_3=-0.3\hat{a}_x$ cm/s.

FIGS. 5a, 5b, 5c and 5d illustrates one embodiment of a velocity profile calculated using the innovative technique for spheres (2) and (3) moving with velocities (9) $\vec{v}_2=0.1\hat{a}_z$ cm/s, $v_3=-0.1\hat{a}_z$ cm/s, (10) $\vec{v}_2=0.3\hat{a}_z$ cm/s, $v_3=-0.3\hat{a}_z$ cm/s, (11) $\vec{v}_2=0.1\hat{a}_z$ cm/s, $v_3=0.1\hat{a}_z$ cm/s, and (12) $\vec{v}_2=0.3\hat{a}_z$ cm/s, $v_3=0.3\hat{a}_z$ cm/s.

A novel solution for velocity profile mapping is provided by the present invention. The proposed method is aimed at determining volumetric velocity profile of multiphase flows. It is based on ECVT and Adaptive ECVT (AECVT) sensors and uses the capacitive sensor sensitivity gradient to measure the velocity profile. U.S. Pat. Nos. 8,614,707 and 9,259,168 are hereby incorporated by reference. Unique and salient aspects to this novel approach are: 1) the gradient of sensitivity distribution of an ECVT or AECVT capacitive sensor is used to extract velocity information from successive capacitance measurements directly; 2) unlike velocimetry based on cross-correlation, the present approach requires only one three-dimensional (3D) reconstructed image. Consequently, the complexity of reconstruction of the present approach to determine the velocity profile is much lower than the cross-correlation velocimetry and similar to that of conventional ECT/ECVT/AECVT permittivity profile reconstruction (i.e., Linear Back Projection and Landweber Iteration).

The main steps of the system and method of the present invention are described as: 1) two successive capacitance measurements are taken from an ECVT or AECVT sensor that surrounds the flow vessel; 2) the time interval between the measurements is determined by the inverse of the frame rate of the data acquisition system; 3) from the capacitance measurements of the first frame, a 3D image is reconstructed using conventional volume tomography (e.g. Linear Back Projection and Landweber Iteration, or neural network based nonlinear technique, etc.) that gives the initial volumetric permittivity distribution inside the vessel; 4) the sensitivity gradient is calculated numerically from sensor sensitivity distribution and voxel dimensions; and 5) then, the data is put together, namely i) the time rate change of capacitance, ii) the initial permittivity distribution, and iii) the sensitivity gradient, with a novel algorithm based on Linear Back Projection, Landweber Iteration, or other commonly used reconstruction methods to yield a 3D velocity profile.

The permittivity distribution relates to the actual distribution of material inside the vessel. Sensitivity distribution is the sensor response to a change in permittivity distribution at different locations inside the vessel. The sensitivity map is constructed for use in inferring permittivity distribution from measured capacitance.

The proposed novel method for velocimetry is best explained based on its mathematical derivation. The sensitivity gradient can be defined as:

$$\vec{F} = \vec{\nabla} S = \hat{a}_x \frac{\partial S}{\partial x} + \hat{a}_y \frac{\partial S}{\partial y} + \hat{a}_z \frac{\partial S}{\partial z} \qquad (1)$$

where S is the sensitivity matrix, whose elements are function of the spatial coordinates x, y, and z. The sensing domain can be discretized into voxels with dimensions Δx, Δy, and Δz each, which allows one to evaluate the sensitivity gradient numerically as:

$$\vec{F} = \hat{a}_x F_x + \hat{a}_y F_y + \hat{a}_z F_z = \hat{a}_x \frac{\Delta S}{\Delta x} + \hat{a}_y \frac{\Delta S}{\Delta y} + \hat{a}_z \frac{\Delta S}{\Delta z} \qquad (2)$$

where $F_x$, $F_y$, and $F_z$ denote the x, y, and z components of sensitivity gradient respectively. Assuming that the capacitance between a pair of electrodes is changed by ΔC as a small dielectric object with permittivity $\epsilon$ is moved from voxel A to voxel B separated by a small distance $\vec{u}=\vec{u}_B-\vec{u}_A$. The change in capacitance can be expressed in terms of sensitivity gradient of voxel A as, at first order:

$$\Delta C = (\vec{F}_A \cdot \vec{u}) \epsilon = (F_x u_x + F_y u_y + F_z u_z)_{|at\ A} \epsilon \qquad (3)$$

Dividing both sides of (3) by the time interval Δt in which the dielectric object is moved:

$$\frac{\Delta C}{\Delta t} = \left( F_x \frac{u_x}{\Delta t} + F_y \frac{u_y}{\Delta t} + F_z \frac{u_z}{\Delta t} \right)_{|at\ A} \epsilon \qquad (4)$$

Defining $$\dot{C} = \frac{\Delta C}{\Delta t}$$

as the rate of change in capacitance, and $$v_x = \frac{u_x}{\Delta t}, v_y = \frac{u_y}{\Delta t}, \text{ and } v_z = \frac{u_z}{\Delta t}$$

as speeds in x, y, and z directions respectively:

$$\dot{C} = (F_x v_x + F_y v_y + F_z v_z)_{lat} \epsilon \quad (5)$$

Equation (5) states the relation among time rate change in measured capacitance, sensitivity gradient, and velocity at a single voxel filled with permittivity $\epsilon$. This formulation can be used to reconstruct 3D velocity vector field by employing an image reconstruction algorithm.

Let $C^{t1}$ and $C^{t2}$ be the measured capacitances from an ECVT sensor at time $t_1$ and $t_2$ respectively. The permittivity distribution g at time $t_1$ can be found using conventional volume tomography (e.g. Linear Back Projection and Landweber Iteration, or neural network based nonlinear technique, etc.). Now, the generalized form of (5) can be written as:

$$\dot{C} = (G \odot F_x) v_x + (G \odot F_y) v_y + (G \odot F_z) v_z \quad (6)$$

The notations used in (6) are all scalar matrices and can be described as:

| Notation | Dimension | Description |
|---|---|---|
| $\dot{C}$ | M × 1 | $\dot{C} = \frac{c^{t2} - c^{t1}}{t_2 - t_1}$ denotes the time rate change of capacitance |
| G | M × N | A matrix with identical rows, each row is essentially the reconstructed permittivity vector $g^T$ at time $t_1$ |
| $F_x, F_y, F_z$ | M × N | x, y, and z components of the sensitivity gradient, calculated from sensitivity matrix S |
| $v_x, v_y, v_z$ | N × 1 | x, y, and z components of the velocity profile |
| $\odot$ | | Element wise product of two matrices, i.e. $C = A \odot B \Leftrightarrow c_{ij} = a_{ij} b_{ij}$ |

For simplification, defining terms as $g_x = G \odot F_x$, $g_y = G \odot F_y$, and $g_z = G \odot F_z$, (6) can be written as:

$$\dot{C} = g_x v_x + g_y v_y + g_z v_z \quad (7)$$

To determine $v_x$, $v_y$, and $v_z$ from (7), Linear Back Projection (LBP) can be applied as follows:

$$v_x = g_x^T \dot{C} \quad (8)$$

$$v_y = g_y^T \dot{C} \quad (9)$$

$$v_z = g_z^T \dot{C} \quad (10)$$

This gives a rough estimate of the velocity profile. To get a more accurate velocity vector field profile, other iterative reconstruction algorithms like Landweber can be used.

In another embodiment of the invention, the processing system is programmed with further instructions to: 1) determine second derivatives of the capacitance measurements; and 2) determine a second order gradient of a sensitivity matrix; and 3) determine acceleration vector fields from the second derivatives of the capacitance measurements and the second order gradient of the sensitivity matrix.

In the sensitivity matrix, the capacitance response of all sensor plate combinations to a perturbation of permittivity in a voxels location is recorded. The same process is repeated for all voxels in the imaging domain. The number of entries in this matrix is equal to the (number of voxels)*(number of capacitance readings between sensor plates). The sensitivity matrix in this case is a characterization of a sensor. Velocity is the first derivative of distance over time and acceleration the second derivative of distance over time.

In another embodiment of the invention, an Adaptive ECVT sensor is used to generate the velocity profile of a vessel interior or other object. In one embodiment, the system is comprised of a sensor, comprising a plurality of electrodes configured to be placed around the vessel or other object, each electrode comprising a plurality of capacitance plate segments; a voltage source; a measurement circuit electrically coupled to the sensor; wherein the plurality of electrodes is comprised of: a first electrode, having a plurality of capacitance plate segments that are addressable with the voltage source; a second electrode, having a plurality of capacitance plate segments, the capacitance plate segments of the second electrode electrically coupled to the measurement circuit; and wherein the capacitance plate segments of the first electrode form capacitance pairs with at least one of the capacitance plate segments of the second electrode when activated; and wherein the system is adapted to collect capacitance data by: defining a capacitor by using a capacitance plate segment on the first electrode as a source electrode, using a capacitance plate segment on the second electrode as a detecting electrode, charging and discharging the defined capacitor by directing a predetermined voltage to the source electrode from the voltage source; detecting a capacitance of the defined capacitor by detecting a current induced in the detecting electrode; and a processing system, in communication with the measurement circuit, the processing system programmed with instructions for executing on the processing system to: 1) convert detected capacitance data into an image; 2) determine a gradient of sensitivity distribution of the sensor; and 3) use the gradient of sensitivity distribution to extract velocity information from successive capacitance measurements.

The processing system can also be programmed with instructions to: 1) receive two successive capacitance measurements for a first and second frame taken from the sensor; 2) determine the time interval between the measurements by the inverse of the frame rate of the measurement circuit; 3) reconstruct an image from the capacitance measurements of the first frame; 4) obtain an initial volumetric permittivity distribution inside the vessel; 5) calculate the sensitivity gradient numerically from sensor sensitivity distribution and voxel dimensions; and 6) determine a velocity profile from the time rate change of capacitance, the initial permittivity distribution and the sensitivity gradient.

In another embodiment, the processing system is programmed with instructions to: 1) determine second derivatives of the capacitance measurements; and 2) determine a second order gradient of a sensitivity matrix of the sensor; and 3) determine acceleration vector fields from the second derivatives of the capacitance measurements and the second order gradient of the sensitivity matrix.

In the AECVT system, the measurement circuit is preferably adapted to receive current from a plurality of the capacitance pairs of the first and second electrodes and convert it to an output voltage (Vo). The image reconstruction processor is also preferably programmed with one or more software routines executing on the processor to determine volume images from the output voltage (Vo). The output voltage (Vo) is a signal having an amplitude, phase, and frequency and wherein the processor is programmed with one or more software routines executing on the processor to determine the capacitance between the first and second electrodes.

The AECVT system is preferably adapted to control the sensitivity of the sensor by changing the frequency of the voltage distribution applied to at least one electrode. The system is adapted to activate one electrode at a time as a source electrode and one electrode as the detecting electrode, and wherein the detecting electrode is connected to the measurement circuit.

While certain embodiments of the present invention are described in detail above, the scope of the invention is not to be considered limited by such disclosure, and modifications are possible without departing from the spirit of the invention as evidenced by the following claims.

What is claimed is:

1. A system for generating a velocity profile of a vessel interior or other object, the system comprising:

a capacitance sensor device comprising a plurality of electrodes arranged in a plurality of planes for placement around the vessel or the object, wherein the capacitance sensor device is adapted to provide electric field distribution and sensor sensitivity in three geometric dimensions;

data acquisition electronics in communication with the capacitance sensor device for receiving input data from the capacitance sensor device, the data acquisition electronics is comprised of a measurement circuit adapted to receive current from a plurality of capacitance pairs formed by pairs of the plurality of electrodes of the capacitance sensor device and to convert the received current to an output voltage;

a processing system in communication with the data acquisition electronics, the processing system programmed with instructions for executing on the processing system to: 1) receive two successive capacitance measurements for a first and second frame taken from the capacitance sensor device; 2) determine the time interval between the capacitance measurements by the inverse of frame rate; 3) reconstruct an image from the capacitance measurements of the first frame; 4) obtain an initial volumetric permittivity distribution inside the vessel; 5) calculate a sensitivity gradient numerically from sensor sensitivity distribution and voxel dimensions; and 6) determine a three dimensional velocity profile from a time rate change of capacitance, the initial volumetric permittivity distribution and the sensitivity gradient.

2. The system according to claim 1, wherein the capacitance sensor device is comprised of at least two planes of electrodes to provide sensor sensitivity in the axial and radial directions.

3. The system according to claim 1, wherein the processing system is programmed with an image reconstruction algorithm.

4. The system according to claim 3, wherein the image reconstruction algorithm is adapted to provide real-time imaging of multiphase flow within the vessel.

5. The system according to claim 1, wherein the processing system is programmed to calculate capacitance data from the input data received by the data acquisition electronics.

6. The system according to claim 1, wherein the processing system is programmed with instructions to: 1) convert a three-dimensional image into an image vector, wherein elements of the image vector are voxels of the three-dimensional image; 2) define a three-dimensional sensitivity matrix related to the image vector and based on geometry of the geometrically three-dimensional capacitance sensor device and a matrix of measured capacitance; 3) compute a volume image vector using a reconstruction algorithm selected based on the three-dimensional sensitivity matrix and matrix of the measured capacitance; and 4) convert the volume image vector to the three-dimensional volume-image.

7. The system according to claim 1, wherein the processing system is programmed with instructions to determine the three dimensional velocity profile based on Linear Back Projection or Landweber Iteration methods.

8. The system according to claim 1, wherein the processing system is programmed with instructions to determine the three dimensional velocity profile in real-time.

9. The system according to claim 1, wherein the capacitance sensor device is an adaptive ECVT sensor.

10. The system according to claim 1, wherein the processing system is programmed with instructions to: 1) determine second derivatives of the capacitance measurements; 2) determine a second order gradient of a sensitivity matrix of the sensor; and 3) determine acceleration vector fields from the second derivatives of the capacitance measurements and the second order gradient of the sensitivity matrix.

* * * * *

UNITED STATES PATENT AND TRADEMARK OFFICE
CERTIFICATE OF CORRECTION

PATENT NO. : 10,488,236 B2  
APPLICATION NO. : 15/051109  
DATED : November 26, 2019  
INVENTOR(S) : Marashdeh et al.

Page 1 of 1

It is certified that error appears in the above-identified patent and that said Letters Patent is hereby corrected as shown below:

In the Specification

Column 1, Line 4, before the first paragraph, please add:
"STATEMENT REGARDING FEDERALLY SPONSORED RESEARCH OR DEVELOPMENT
This invention was made with government support under DE-SC0011936 awarded by the Department of Energy. The government has certain rights in the invention."

Signed and Sealed this
Eighteenth Day of August, 2020

Andrei Iancu
*Director of the United States Patent and Trademark Office*